United States Patent
Li et al.

(10) Patent No.: US 11,762,512 B2
(45) Date of Patent: *Sep. 19, 2023

(54) FABRIC-COVERED ELECTRONIC DEVICE WITH TOUCH SENSOR

(71) Applicant: Apple Inc., Cupertino, CA (US)

(72) Inventors: Zhengyu Li, Shanghai (CN); Elvis M. Kibiti, San Jose, CA (US); Ming Gao, Shanghai (CN); Qiliang Xu, Alamo, CA (US); Chen Zhang, Shanghai (CN)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/484,930

(22) Filed: Sep. 24, 2021

(65) Prior Publication Data

US 2022/0011905 A1    Jan. 13, 2022

Related U.S. Application Data

(63) Continuation of application No. 16/402,115, filed on May 2, 2019, now Pat. No. 11,137,861.

(Continued)

(51) Int. Cl.
*G06F 3/00* (2006.01)
*G06F 3/044* (2006.01)
(Continued)

(52) U.S. Cl.
CPC ............ *G06F 3/0443* (2019.05); *G06F 3/165* (2013.01); *H04R 1/025* (2013.01)

(58) Field of Classification Search
CPC ........... G06F 3/162–167; G06F 3/0443; G06F 3/165; H04R 1/025
See application file for complete search history.

(56) References Cited

U.S. PATENT DOCUMENTS 9,894,428 B1    2/2018  Chamberlin et al.
9,894,789 B1 *  2/2018  Hamada ................. B32B 37/12
(Continued)

FOREIGN PATENT DOCUMENTS

CN       202584068 U    12/2012
CN       105074618 A    11/2015
(Continued)

OTHER PUBLICATIONS

Daniel D. Sunshine et al., U.S. Appl. No. 15/467,986, filed Mar. 23, 2017.

(Continued)

*Primary Examiner* — Roy P Rabindranath
(74) *Attorney, Agent, or Firm* — Treyz Law Group, P.C.; Kendall P. Woodruff

(57) ABSTRACT

An electronic device such as a speaker device may have a curved housing characterized by a vertical longitudinal axis. A layer of fabric may cover the curved housing. A touch sensor may be used to detect touch input on the layer of fabric. The touch sensor may include capacitive touch sensor electrodes including drive lines and sense lines. In some arrangements, the touch sensor is formed from conductive strands in the layer of fabric. In other arrangements, the touch sensor is formed from conductive traces on a substrate. The substrate may be formed from portions of the curved housing or may be formed from a layer that is separate from the housing. Light-emitting components and/or fabric with different visual characteristics may be used to mark where the touch-sensitive regions of the fabric are located. The touch-sensitive regions may be shaped as media control symbols.

20 Claims, 9 Drawing Sheets

Related U.S. Application Data

(60) Provisional application No. 62/727,131, filed on Sep. 5, 2018.

(51) Int. Cl.
*G06F 3/16* (2006.01)
*H04R 1/02* (2006.01)

(56) References Cited

U.S. PATENT DOCUMENTS

| | | | |
|---|---|---|---|
| 9,930,444 | B1 | 3/2018 | Stanley et al. |
| 2010/0265172 | A1 | 10/2010 | Sadahiro |
| 2011/0318985 | A1 | 12/2011 | McDermid |
| 2012/0008818 | A1 | 1/2012 | Ohashi et al. |
| 2012/0162126 | A1* | 6/2012 | Yuan ............ G06F 3/042 345/174 |
| 2013/0324254 | A1* | 12/2013 | Huang ............ A63F 13/214 463/37 |
| 2015/0009161 | A1 | 1/2015 | Park et al. |
| 2016/0284436 | A1* | 9/2016 | Fukuhara ............ H01B 1/026 |
| 2017/0010707 | A1 | 1/2017 | Son |
| 2017/0249033 | A1 | 8/2017 | Podhajny et al. |
| 2017/0325518 | A1 | 11/2017 | Poupyrev et al. |
| 2018/0038022 | A1 | 2/2018 | Podhajny et al. |
| 2018/0123481 | A1* | 5/2018 | Zhi ............ H02N 99/00 |
| 2018/0187348 | A1* | 7/2018 | Mueller ............ B32B 5/026 |
| 2019/0025953 | A1 | 1/2019 | Ma et al. |

FOREIGN PATENT DOCUMENTS

| | | |
|---|---|---|
| CN | 106471680 A | 3/2017 |
| CN | 107209617 A | 9/2017 |
| JP | 2017091492 A | 5/2017 |
| KR | 101656312 B1 | 9/2016 |
| TW | M424889 U | 3/2012 |

OTHER PUBLICATIONS

Daniel D. Sunshine et al., U.S. Appl. No. 16/140,409, filed Sep. 24, 2018.

Paul X. Wang et al., U.S. Appl. No. 16/141,805, filed Sep. 25, 2018.

"Watch: A Speaker With a Springy Fabric UI, Wired", Sep. 19, 2013, 2 pages, [Retrieved on May 2, 2019], Retrieved from the Internet: <URL: https://www.wired.com/2013/09/a-speaker-with-a-springy-fabric-ui/>.

* cited by examiner

FABRIC-COVERED ELECTRONIC DEVICE WITH TOUCH SENSOR

This application is a continuation of U.S. patent application Ser. No. 16/402,115, filed May 2, 2019, which claims the benefit of U.S. provisional patent application No. 62/727,131, filed Sep. 5, 2018, both of which are hereby incorporated by reference herein in their entireties.

FIELD

This relates generally to electronic devices and, more particularly, to electronic devices with fabric.

BACKGROUND

Electronic devices such as audio devices may include fabric. As an example, the housing of a speaker may be covered with a layer of fabric. Openings may be provided in the fabric to allow sound to be emitted from within the device.

It may be challenging to enhance the functionality of a speaker. For example, it may be difficult to integrate input and output devices into a speaker with a fabric layer. If care is not taken, the user may find it cumbersome to provide input to and receive output from the speaker.

SUMMARY

An electronic device such as a touch-controlled and/or voice-controlled speaker device may have a housing characterized by a vertical axis. The housing may have a cylindrical shape with upper and lower ends that have surface regions of compound curvature. The housing may be covered by a fabric layer such as a knit fabric layer with diamond-shaped openings.

A touch sensor may be used to detect touch input on the layer of fabric. The touch sensor may include capacitive touch sensor electrodes including drive lines and sense lines. In some arrangements, the touch sensor is formed from conductive strands in the layer of fabric. In other arrangements, the touch sensor is formed from conductive traces on a substrate. The substrate may be formed from portions of the curved housing or may be formed from a separate layer. Light-emitting components and/or fabric with different visual characteristics may be used to mark where the touch-sensitive regions of the fabric are located. The touch-sensitive regions may be shaped as media control symbols.

DETAILED DESCRIPTION

Figure 1:
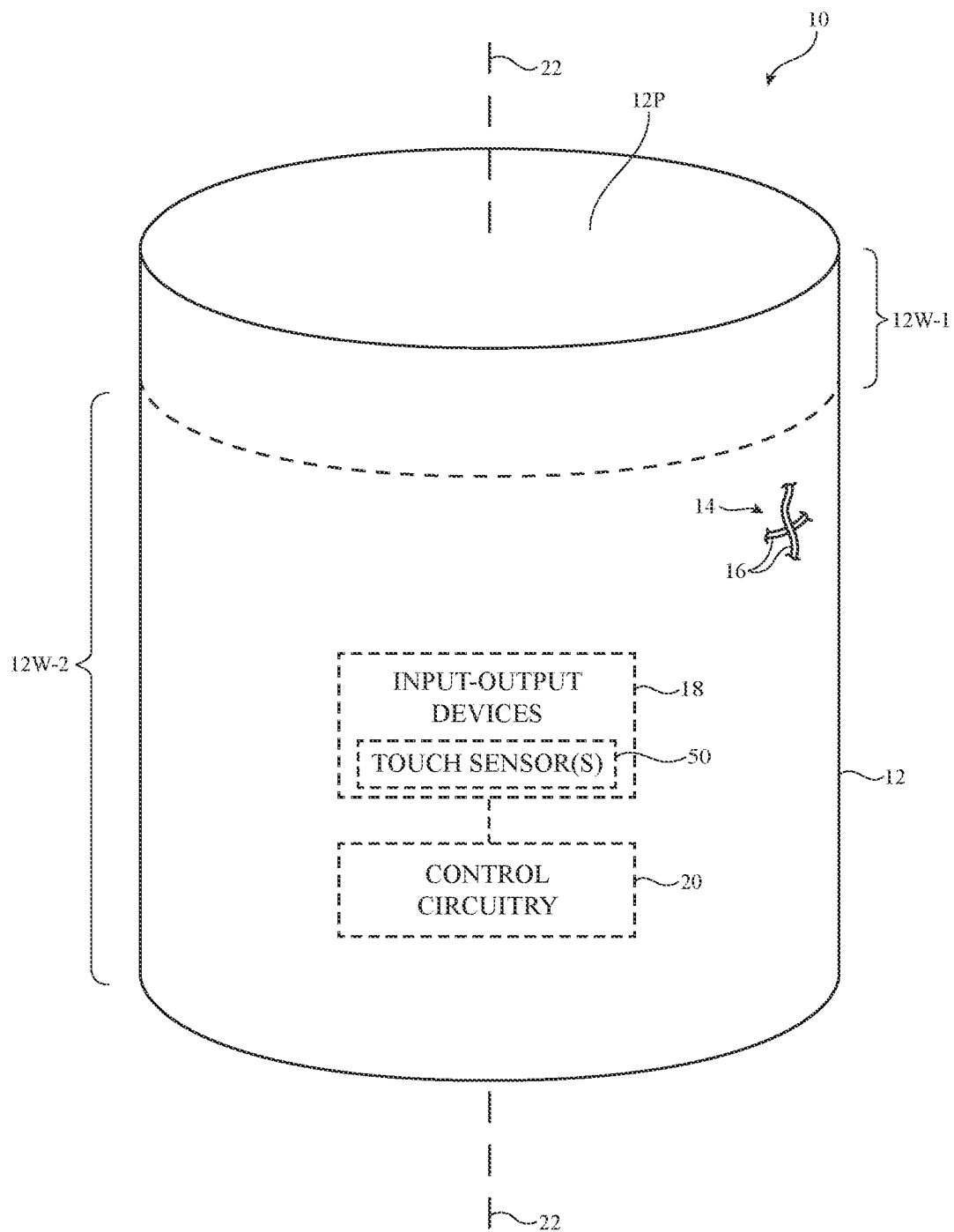
FIG. 1 is a perspective view of an illustrative electronic device having a housing covered with a fabric layer in accordance with an embodiment.

Items such as item 10 of FIG. 1 may include fabric. For example, fabric may be used in forming one or more covering layers for item 10 of FIG. 1. Item 10 may be an electronic device or an accessory for an electronic device such as a voice-controlled electronic device (sometimes referred to as a digital assistant or voice-controlled speaker), a laptop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which fabric-based item 10 is mounted in a kiosk, in an automobile, airplane, or other vehicle, other electronic equipment, or equipment that implements the functionality of two or more of these devices. If desired, item 10 may be a removable external case for electronic equipment, may be a strap, may be a wrist band or head band, may be a removable cover for a device, may be a case or bag that has straps or that has other structures to receive and carry electronic equipment and other items, may be a necklace or arm band, may be a wallet, sleeve, pocket, or other structure into which electronic equipment or other items may be inserted, may be part of a chair, sofa, or other seating (e.g., cushions or other seating structures), may be part of an item of clothing or other wearable item (e.g., a hat, belt, wrist band, headband, shirt, pants, shoes, etc.), or may be any other suitable fabric-based item. In the illustrative configuration of FIG. 1, item 10 is a voice-controlled and/or touch-controlled electronic device such as a speaker with internet access. Other types of device may incorporate fabric, if desired.

As shown in FIG. 1, item 10 may include a housing such as housing 12. Housing 12 may have a cylindrical shape with rounded upper and lower ends of the type shown in FIG. 1 or other suitable shape (e.g., a pyramidal shape, a conical shape, a box shape such as a rectangular box shape, a spherical shape, etc.). Housing 12 may include support structures formed from metal, polymer, ceramic, glass, wood, other materials, and/or combinations of these materials. The shape of housing 12 may be selected to form an enclosure suited to the type of item 10 for which the housing is being used. As an example, in scenarios in which item 10 is a voice-controlled electronic device, housing 12 may be cylindrical, pyramidal, box-shaped, conical, spherical, or other shapes suitable for enclosing one or more speakers; in configurations in which item 10 is a laptop computer, housing 12 may have upper and lower thin box-shaped portions that are joined with a hinge and that can respectively house a display and a keyboard; in configurations in which item 10 is a computer monitor containing an embedded computer, housing 12 may have a slender box shape with optionally curved rear housing walls that can hold a display and be mounted on a stand; in configurations in which item 10 is a tablet computer, cellular telephone, media player, or other handheld or portable electronic device, housing 12 may have a rectangular outline and a thin depth; in configurations in which item 10 is a smaller device such as a wristwatch device or a pendant device, housing 12 may have a thin profile and an outline that is rectangular, square, hexagonal, triangular, oval, or circular; in configurations in which item 10 is a headphone or earpiece device, housing 12 may have a shape configured to fit on or in a user's ear; in configurations in which item 10 is a pair of eyeglasses or other equipment worn on a user's head, housing 12 may have a head-mountable shape; in configurations in which item 10 is a jacket or other item of clothing (e.g., a hat, belt, wrist band, headband, shirt, pants, shoes, etc.), housing 12 may be formed from layers of fabric or other material configured to allow item 10 to be worn on a user's body; in configurations in which item 10 is a television, a computer display that does not contain an embedded computer, a gaming device, or a navigation device, housing 12 may have a rectangular outline, an outline with curved sides and/or straight sides, a box shape, a cylindrical shape, and/or other suitable shapes; in configurations in which item 10 is a kiosk, housing 12 can form a pedestal or other shape suitable for a kiosk; in configurations in which item 10 forms part of an automobile, airplane, or other vehicle, housing 12 may form a dashboard, console, door, window, seat, body panel, or other portion of the vehicle; in configurations in which item 10 is a removable external case for electronic equipment, housing 12 may have the shape of a sleeve or other structure with a recess for receiving the electronic equipment; in configurations in which item 10 is a strap, wrist band, necklace or headband, housing 12 may have a strip shape; in configurations in which item 10 forms a case, bag, or wallet, housing 12 may have surfaces that form the walls of the case and/or sides of the bag or wallet and/or that forms straps and/or other structures for the case or bag; and in configurations in which item 10 is part of furniture, housing 12 may be configured to form a part of a chair, sofa, or other seating (e.g., cushions or other seating structures). In the illustrative configuration of FIG. 1, housing 12 has a cylindrical shape suitable for an item such as a voice-controlled and/or touch-controlled speaker with internet access. Housing 12 may have other shapes and may be incorporated into other items, if desired. The configuration of FIG. 1 is presented as an example.

Item 10 may include fabric 14. Fabric 14 may form all or part of a housing wall or other layer in an electronic device, may form the outermost layer of item 10, may form one or more inner covering layers, may form internal structures in an electronic device, or may form other fabric-based structures. Item 10 may be soft (e.g., item 10 may have a fabric surface that yields to a light touch), may have a rigid feel (e.g., the surface of item 10 may be formed from a stiff fabric), may be coarse, may be smooth, may have ribs or other patterned textures, and/or may be formed as part of a device that has portions formed from non-fabric structures of plastic, metal, glass, crystalline materials, ceramics, or other materials. In an illustrative configuration, some or all of the upper surface of housing 12 such as portion 12P may be formed from rigid polymer or other non-fabric structure and the sidewall surfaces of housing 12 may be covered with fabric 14. Portion 12P may include touch sensors, light-emitting devices (e.g., light-emitting diodes that backlight button icons and/or that produce other visual output for a user), and/or other input-output components. If desired, fabric 14 may cover some or all of portion 12P. Fabric 14 may serve as a cosmetic cover for item 10 that overlaps audio components (microphones and/or speakers) and is permeable to sound and and/or may be incorporated into other portions of item 10.

Fabric 14 may include intertwined strands of material such as strands 16. Fabric 14 may, for example, include warp knit fabric that is formed by warp knitting strands 16 and/or may include woven fabric, fabric with braided strands of material, etc. Strands 16 may be single-filament strands (sometimes referred to as fibers or monofilaments) or may be strands of material formed by intertwining multiple monofilaments of material together (sometimes referred to as yarns).

Strands 16 may be formed from polymer, metal, glass, graphite, ceramic, magnetic materials, natural materials such as cotton or bamboo, or other organic and/or inorganic materials and combinations of these materials. Conductive coatings such as metal coatings may be formed on non-conductive material. For example, plastic strands in fabric 14 may be coated with metal to make them conductive. Reflective coatings such as metal coatings may be applied to make strands reflective. Strands formed from white polymer (e.g., light-scattering particles in polymer) and/or that are coated with white polymer may help reflect light in some configurations. If desired, strands may be formed from bare metal wires or metal wire intertwined with insulating monofilaments (as examples). Bare metal strands and strands of polymer covered with conductive coatings may be provided with insulating polymer jackets. In some configuration, strands 16 may include optical fibers (e.g., lossy optical fibers with surface roughening or other features that allow the strands to guide light while emitting portion of the guided light outwardly). Optical waveguide strands (e.g., lossy optical fibers formed from glass, transparent polymer, etc.) can be provided with light from light sources such as light-emitting diodes to display information (e.g., desired patterns of light). In some cases, it may be desirable for lossy fiber to appear dark or colored in reflection when illuminated by external light, so that the lossy fiber may match the appearance of other fibers. In these cases, the lossy fiber can include regions that are colored on the outside of the fiber but only leak light slightly or not at all and other regions that emit light due to roughen of the fiber surface or localized adjustments to the cladding of the fiber in that region (e.g., localized cladding thinning).

Items such as item 10 may, if desired, include control circuitry 20. Control circuitry 20 may include microprocessors, microcontrollers, application-specific integrated-circuits, digital signal processors, baseband processors, and/or other controllers and may include storage such as random-access memory, read-only memory, solid state drives, and/or other storage and processing circuitry.

Control circuitry 20 may gather information from sensors and other circuitry in input-output devices 18 and may use input-output devices 18 to supply output. Input-output devices 18 may, for example, include audio devices such as microphones and speakers. Microphones can gather audio input (e.g., sound that passes through fabric 14 such as voice commands for controlling the operation of item 10). Speakers can produce audio output (e.g., sound that passes through fabric 14). Sensors in input-output devices 18 may include touch sensors, force sensors, capacitive sensors, optical sensors, proximity sensors, strain gauges, temperature sensors, moisture sensors, gas sensors pressure sensors, magnetic sensors, position and orientation sensors (e.g., accelerometers, gyroscopes, and/or compasses), and/or other sensors. Light-emitting diodes, displays, and other visual output devices may be used in supply visual output to a user. As an example, visual output devices may be used to form illuminated buttons, displays that display images, visual feedback areas that display still and/or moving patterns of light to indicate to a user that a command has been received and/or is being processed by control circuitry 20, etc. Buttons, joysticks, haptic output components, and/or other input-output components may be provided in input-output devices 18 to gather input from a user and to provide a user with output. Wireless circuitry in circuitry 20 (e.g., wireless local area network circuitry, cellular telephone circuitry, etc.) may be used to support wireless communications with external equipment.

Input-output devices 18 in item 10 may include one or more touch sensors such as touch sensor 50. Touch sensor 50 may be formed from capacitive touch sensor electrodes or other touch sensor structures (e.g., piezoelectric touch sensor structures, resistive touch sensor structures, acoustic touch sensor structures, force-based touch sensor structures, light-based touch sensor structures, etc.). With one illustrative configuration, which may sometimes be described herein as an example, item 10 may incorporate a touch sensor that is formed from conductive strands of material in a layer of fabric (see, e.g., fabric 14 of FIG. 1). The conductive strands in a fabric touch sensor may include horizontal strands of material that overlap with perpendicular vertical strands of material to form a grid of touch sensor electrodes that intersect at an array of intersection locations. A fabric touch sensor of this type may, as an example, overlap some or all of housing 12 and may thereby serve as an integral touch surface with which a user may supply touch input (multitouch gestures, single-finger pointer-control input for an on-screen cursor in arrangements where item 10 has a display, swipes, taps, and other touch commands). In general, item 10 may include any suitable input-output devices (e.g., buttons, capacitive touch sensors or other touch sensors, etc.).

If desired, light-emitting devices (e.g., lasers or light-emitting diodes) may be arranged in an array of pixels to form a display or other light-based output device. As an example, light-emitting devices may be formed under one or more covering layers (e.g., fabric) on item 10. If desired, light-emitting devices may be used to indicate where touch sensors 50 are located on housing 12 and/or may be used to provide feedback to a user in response to touch input on touch sensors 50.

Light-emitting devices and/or touch sensors 50 may be formed just in a ring-shaped upper region 12W-1 that runs around the upper edge of item 10, may be formed only in upper portion 12P, may be formed only on sidewall surface 12W-2, and/or may be formed on one or more other portions of item 10 (e.g., on some or all of exterior sidewall surface 12W-2). In general, the surfaces of item 10 such as the surface of housing portion 12P and the sidewalls of item 10 may be provided with any suitable input-output devices 18. Sidewall locations in item 10 (e.g., the upper sidewall area associated with region 12W-1 and/or the sidewall areas associated with region 12W-2) may, as an example, be provided with light-emitting devices (e.g., to form a pixel array for displaying images that include text, still image content, moving image content, icons, etc.), may be provided with sensors (e.g., an array of force sensors, touch sensors, proximity sensors, gesture sensors, accelerometers for gathering touch/tap input, domes switches or other pressure-activated switches, etc.), and/or other input-output devices 18. These sidewall locations in item 10 may wrap partly or entirely around the periphery of item 10 (e.g., light-emitting devices, sensors, and/or other components may be provided on sidewall areas that wrap around a longitudinal axis 22 of item 10 such as vertical axis 22 and extend along some or all of the circumference of item 10) and/or may extend vertically along item 10 (e.g., parallel to longitudinal axis 22 of item 10). Some or all of the surfaces of item 10 may be covered with one or more layers of material including fabric and/or other layer(s) such as polymer layers, metal layers, etc. If desired, light-emitting devices in item 10 may emit light in the infrared, which is invisible to the user, but can be detected by external sensors and devices to support light-based communication between item 10 and external devices. Item 10 may also include infrared light-detectors to support infrared light-based communications and sensing.

Figure 2:
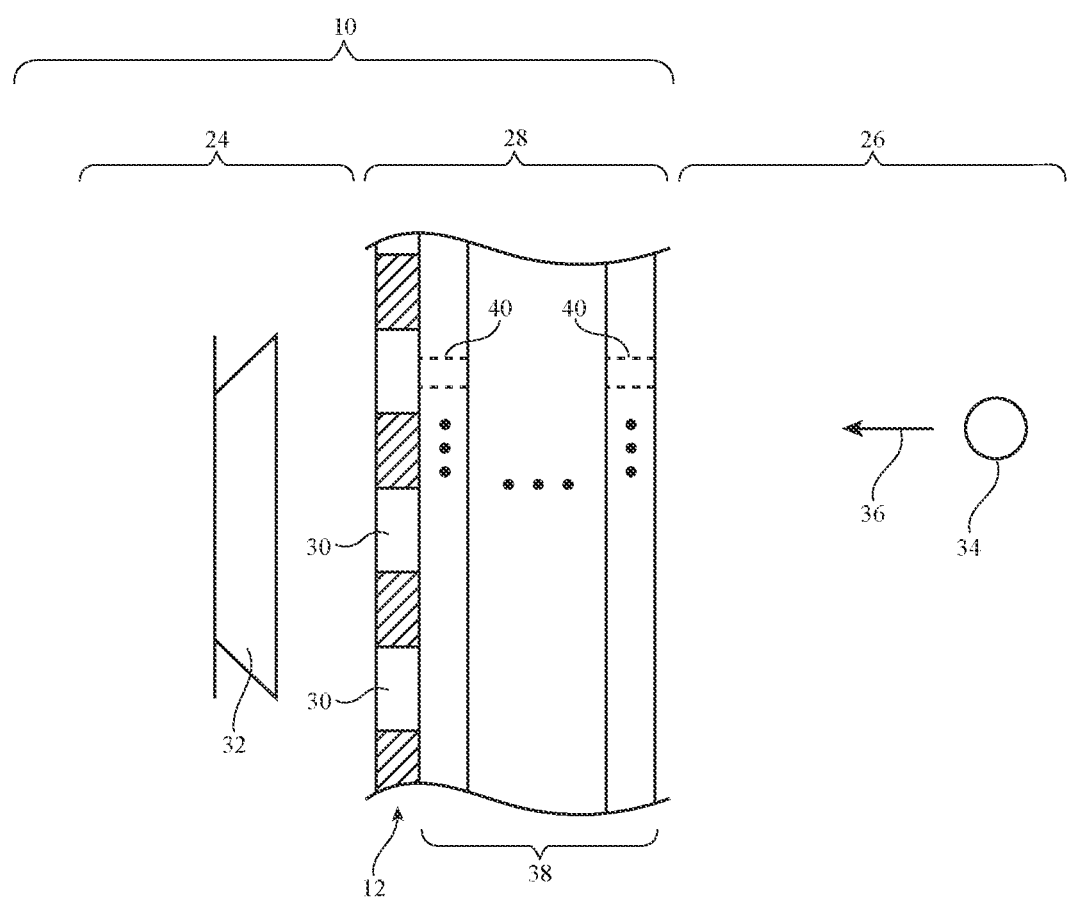
FIG. 2 is a cross-sectional side view of a portion of the device of FIG. 1 covered with illustrative layers of material in accordance with an embodiment.

A cross-sectional side view of a portion of item 10 is shown in FIG. 2. In the example of FIG. 2, item 10 includes internal components such as one or more speakers 32 in interior 24 of item 10. Wall structures 28 (e.g., sidewall structures) may separate interior 24 from exterior 26. A user of item 10 (e.g., user 34) may view the exterior of item 10 in direction 36 and may listen to sound that has been emitted from speaker 32 and that has passed through wall structures 28.

Wall structures 28 may include a housing formed from one or more rigid support structures (e.g., a metal housing wall, a plastic housing wall, a housing wall formed from other material and/or combinations of these materials). As shown in FIG. 2, for example, wall structures 28 may include housing 12 (e.g., a housing wall such as a housing sidewall and/or other housing wall structures). Housing 12 may have acoustic openings 30 to allow sound to pass through housing 12. Openings 30 may be circular, square, diamond-shaped, or may have other suitable shapes. The lateral dimensions of openings 30 may be at least 0.1 mm, at least 1 mm, at least 5 mm, at least 15 mm, less than 30 mm, less than 60 mm, or other suitable size.

Covering layers 38 may overlap the exterior surface of housing 12. Covering layers 38 may have openings 40. The outermost of covering layers 38 may, as an example, serve as a cosmetic layer (e.g., a layer that provides item 10 with a desired color, texture, etc.). Inner covering layers (e.g., layers 38 that are interposed between the outermost layer and housing 12) may include adhesive layers for attaching layers together, cushioning layers (e.g., layers of foam and/or fabric to provide layers 38 with a cushiony feel), component layers (e.g., touch sensor 50, substrates with electrodes, metal traces forming interconnects, integrated circuits, light-emitting components, and/or other circuitry), light-modifying layers (e.g., diffuser layers, reflective layers, layers for hiding internal components from view, etc.), component-hiding layers or other layers such as acoustically transparent layers that block light and/or that block moisture, dust, and other environmental contaminants, and/or other covering layer structures. Layers 38 may, if desired, include coating layers (e.g., one or more layers of liquid polymer containing light-scattering particles, dye, pigment, and/or other materials that can be applied in liquid form and cured to form solid coatings, coating layers of metal or other materials deposited using physical vapor deposition, chemical vapor deposition, and/or electrochemical deposition, and/or other coatings.

One or more of layers 38 may include fabric 14. Fabric 14 may, for example, overlap some or all of the exterior of housing 12 (e.g., fabric 14 may overlap at least region 12W-2 of FIG. 1). Fabric 14 may also be used in forming straps, covers, wearable items, and/or other structures for item 10.

Figure 3:
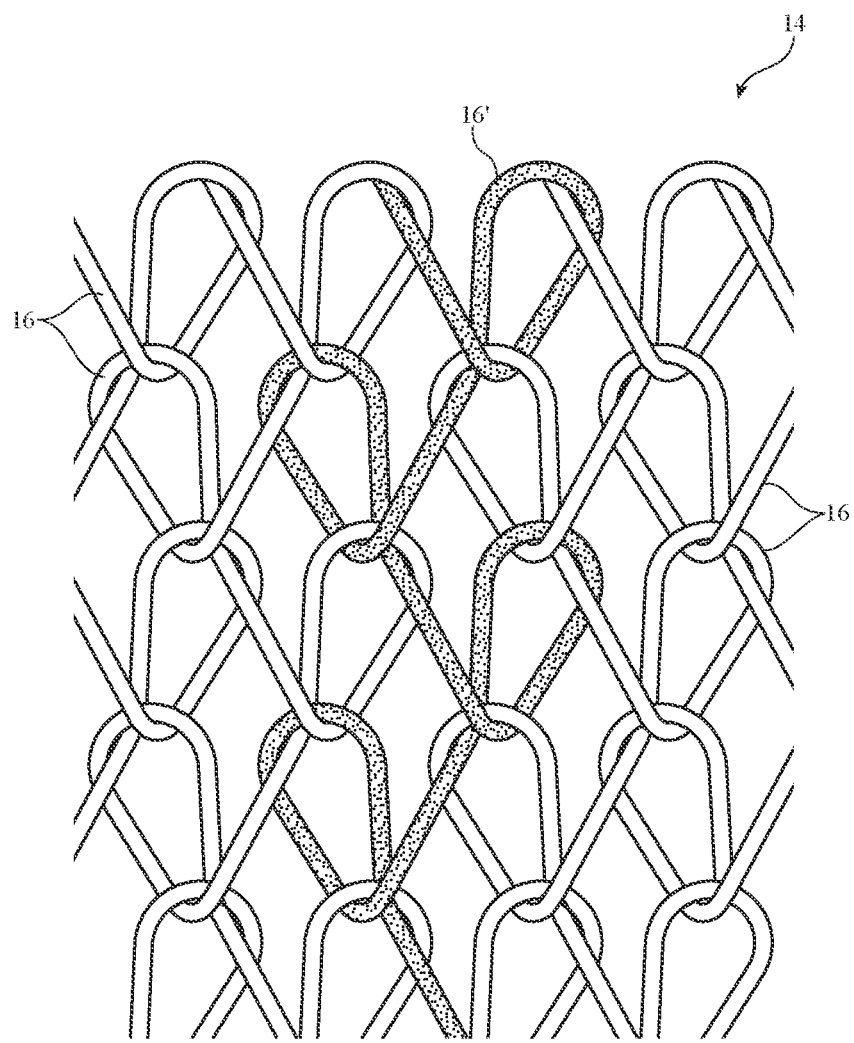
FIG. 3 is a diagram of a portion of an illustrative layer of warp knit fabric in accordance with an embodiment.

A warp knitting machine or other equipment (e.g., weaving equipment, braiding equipment, weft knitting equipment, etc.) may be used in intertwining strands 16 to form fabric 14. In general, fabric 14 may be any suitable type of fabric (e.g., woven fabric, knit fabric, braided fabric, etc.). A layer of illustrative warp knit fabric 14 is shown in FIG. 3. An illustrative strand 16' among strands 16 has been highlighted to show the zig-zag path taken by each strand in fabric 14.

During the process of forming fabric 14 (e.g., during knitting), a warp knitting machine or other fabric fabrication equipment that is forming fabric 14 may, if desired, direct positioners in the equipment to incorporate openings into fabric 14. As an example, the equipment may be directed to form knit fabric or other fabric that includes diamond-shaped openings or openings of other suitable shapes, as illustrated by openings 42 in warp knit fabric 14 of FIG. 4. In configurations in which fabric 14 forms one of layers 38, openings 42 may serve as openings 40 of FIG. 2.

Touch sensor 50 may be incorporated into item 10 to create touch sensitive regions on item 10 for receiving touch input from a user. Touch sensor 50 may be located on a portion of housing 12 that is covered by fabric 14 and/or may be located on a portion of housing 12 that is uncovered by fabric 14. Touch sensor 50 may be formed from conductive strands in fabric 14 and/or may be formed from conductive traces on a substrate. For example, housing 12 and/or one or more of layers 38 of FIG. 2 may serve as a substrate for touch sensor 50. Touch sensor 50 may be integrated with fabric 14, may be covered by fabric 14, and/or may be located in portions of item 10 that do not overlap fabric 14. Touch sensor 50 may, for example, form one of layers 38 of FIG. 2.

Touch sensor 50 may sense touch and/or force using capacitive touch electrodes, soft piezoelectric polymers, microelectromechanical systems (MEMs) force sensors, a strain gauge, resistive force sensors, optical sensors that measure skin color changes due to pressure variations, other optical sensors, and/or other force sensing components.

Figure 5:
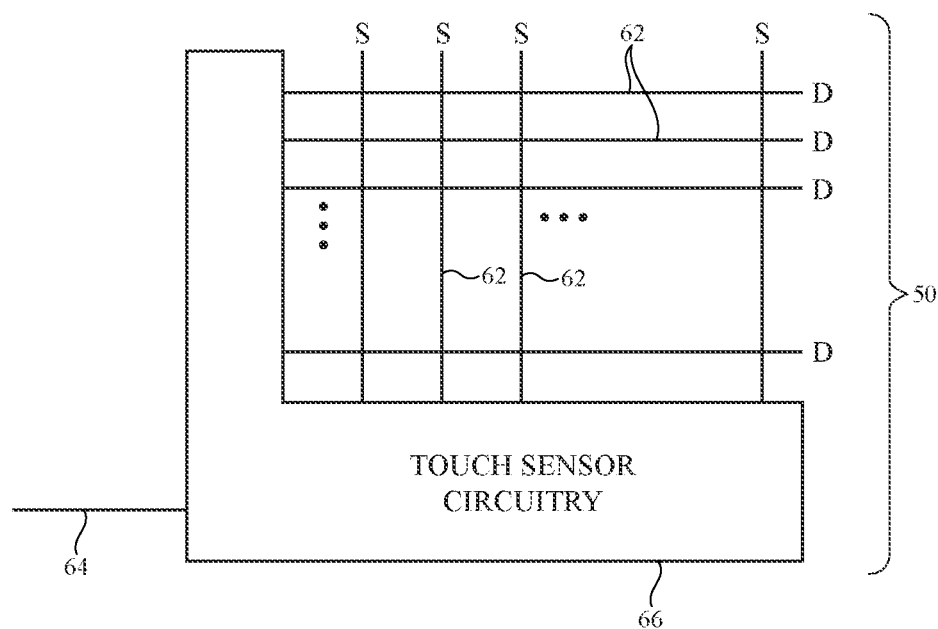
FIG. 5 is a schematic diagram of an illustrative touch sensor that may be used in an electronic device of the type shown in FIG. 1 in accordance with an embodiment.

FIG. 5 is a schematic diagram showing an illustrative arrangement for touch sensor 50 of device 10. As shown in FIG. 5, device 10 may include touch sensor control circuitry 66 (e.g., touch sensor control circuitry that forms part of control circuitry 20 of FIG. 1).

Conductive lines 62 may serve as capacitive electrodes in capacitive touch sensor 50 (e.g., a touch sensor grid). Conductive lines 62 may be formed from patterned traces (e.g., traces of transparent conductive material such as indium tin oxide, other thin-film materials, other conductive materials such as metal, etc.) on housing 12 and/or fabric 14, may be formed from conductive strands of material in fabric 14, may be formed from patterned traces on a layer that is separate from fabric 14 and housing 12 such as a layer of polymer or other material, and/or may be formed from other conductive structures that form capacitive touch sensor electrodes.

As shown in FIG. 5, touch sensor 50 includes touch sensor circuitry 66 coupled to a set of horizontal lines 62 and a perpendicular set of vertical lines 62. Touch sensor circuitry 66 may provide drive signals D to one of these sets of lines 62 (e.g., horizontal lines 62 in the example of FIG. 5) and may gather corresponding sense signals S on the other of these sets of lines 62 (e.g., vertical lines 62 in the example of FIG. 5). Capacitive coupling between the drive and sense lines varies in the presence of a user's finger over a drive-line-to-sense-line intersection. As a result, touch sensor circuitry 66 can process the drive and sense signals to determine which of the intersections of the horizontal and vertical lines 62 are being overlapped by a user's finger(s) or other external objects. When touch input is detected in this way, touch sensor circuitry 66 may provide a processor or other control circuitry in device 10 or other equipment with information on the touch input using a path such as path 64.

Figure 6:
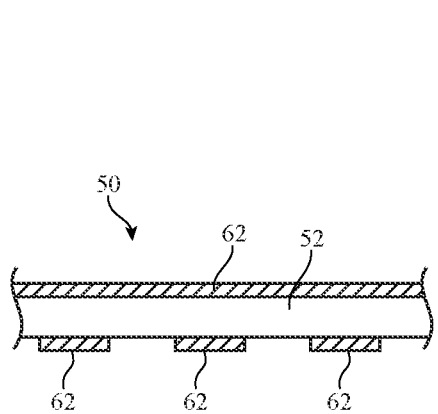
FIG. 6 is a cross-sectional side view of an illustrative touch sensor having electrodes formed from conductive material on a substrate in accordance with an embodiment.

FIG. 6 is a cross-sectional side view showing an illustrative arrangement for touch sensor 50 in which signal lines 62 are formed from conductive lines on a substrate such as substrate 52. Substrate 52 may be a portion of fabric 14, may be a portion of housing 12, or may be a substrate that is separate from fabric 14 and housing 12 (e.g., a substrate formed from polymer, glass, ceramic, fabric, and/or other suitable materials). Signals lines 62 may be formed from transparent conductive material such as indium tin oxide or may be formed from other conductive materials such as metal.

Figure 7:
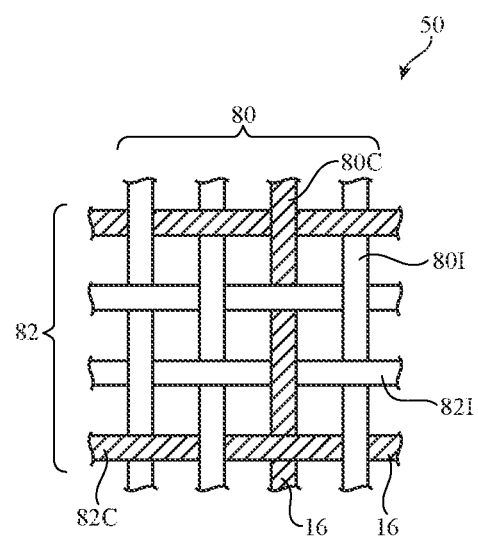
FIG. 7 is a top view of an illustrative touch sensor having electrodes formed from conductive strands in accordance with an embodiment.

FIG. 7 is a top view showing an illustrative arrangement for touch sensor 50 in which signal lines 62 are formed from conductive strands of material in fabric 14. As shown in FIG. 7, fabric 14 may include warp strands 80 and weft strands 82. Warp strands 80 run along a first dimension of fabric 14 (e.g., the vertical dimension in the orientation of FIG. 7) and weft strands 82 run perpendicularly along a second dimension of fabric 14 (e.g., the horizontal dimension in the orientation of FIG. 7). Some of warp strands 80 such as strands 80I may be insulating and some of strands 80 such as strands 80C may be conductive and may therefore serve as the vertically extending electrodes 62 in touch sensor 50. Some of weft strands 82 such as weft strands 82I may be insulating and some of strands 82 may be conductive such as strands 82C and may therefore serve as horizontally extending electrodes 62 in touch sensor 50. Fabric 14 of FIG. 7 has a plain weave, but in general, fabric 14 may have any suitable construction (e.g., fabric 14 may have a basket weave, may be knitted, may be braided, or may have any other suitable fabric construction).

Figure 8:
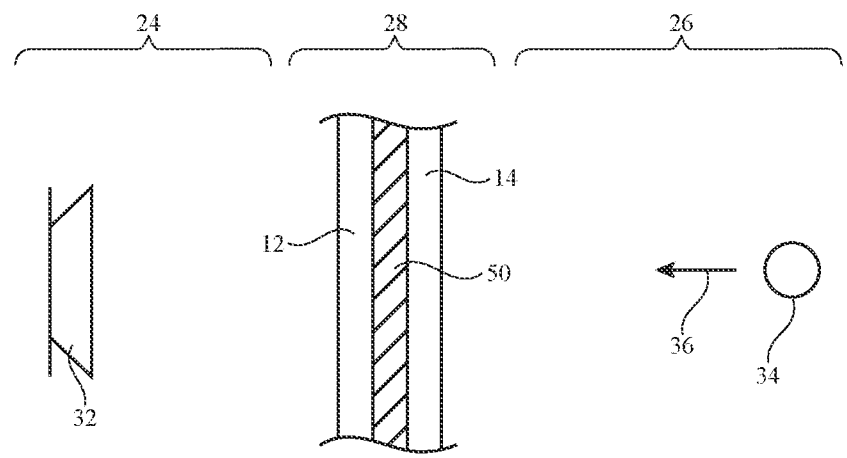
FIG. 8 is a cross-sectional side view of a portion of an illustrative electronic device having a touch sensor under a fabric layer in accordance with an embodiment.
Figure 9:
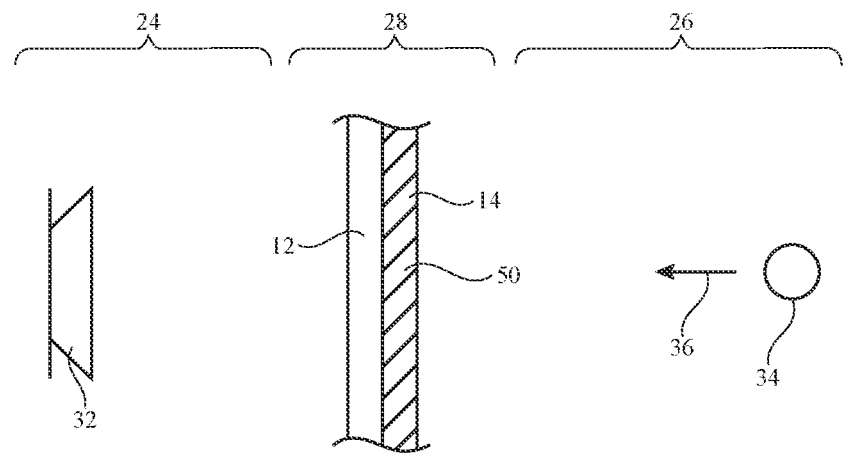
FIG. 9 is a cross-sectional side view of a portion of an illustrative electronic device having a touch sensor integrated with a fabric layer in accordance with an embodiment.

FIGS. 8 and 9 show illustrative configurations for touch sensor 50 in device 10. In the example of FIG. 8, touch sensor 50 is interposed between housing 12 and fabric 14. Touch sensor 50 of FIG. 8 may be formed from conductive traces 62 on a substrate (e.g., substrate 52 of FIG. 6). If desired, housing 12 may serve as a substrate for the traces 62 of touch sensor 50, or traces 62 of touch sensor 50 may be formed on a substrate that is separate from housing 12.

In the example of FIG. 9, touch sensor 50 is integrated into fabric 14. For example, traces 62 of touch sensor 50 may be formed on a substrate (e.g., substrate 52 of FIG. 6) that is embedded into fabric 14 or traces 62 of touch sensor 50 may be formed from conductive portions of fabric 14 (e.g., as shown in FIG. 7). In arrangements where touch sensor 50 is integrated into fabric 14, one or more additional layers of fabric 14 or other materials may be used to cover touch sensor 50, if desired.

Touch sensor 50 may form one of layers 38 of FIG. 2. Similar to the other layers 38 of FIG. 2, touch sensor 50 may include one or more openings such as openings 40 to allow sound from speaker 32 to pass through wall structures 28 of device 10. Openings 40 may pass through the substrate of touch sensor 50 (e.g., in arrangements where touch sensor 50 is formed from traces 62 on a substrate such as substrate 52 of FIG. 6) and/or may pass through fabric 14 (e.g., in arrangements where touch sensor 50 is formed from conductive strands in fabric 14 of FIG. 7).

Figure 10:
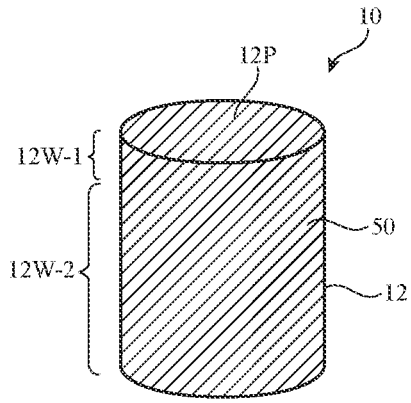
FIGS. 10, 11, 12, 13, 14, and 15 are side views of an illustrative electronic device having a touch sensor in various locations in accordance with an embodiment.

FIGS. 10, 11, 12, 13, 14, and 15 show illustrative locations for touch sensor 50 on device 10. In the example of FIG. 10, touch sensor 50 extends across the entire surface of housing 12, including top portion 12P, upper wall region 12W-1, and lower wall region 12W-2.

Figure 11:
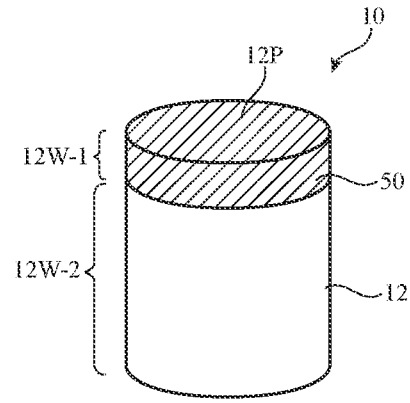

In the example of FIG. 11, touch sensor 50 extends only across top portion 12P and upper wall region 12W-1. Lower wall region 12W-2 may be free of touch sensors, if desired.

Figure 12:
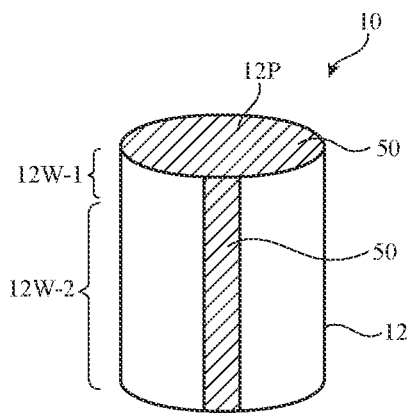

In the example of FIG. 12, touch sensor 50 is located on top portion 12P and select portions of lower wall region 12W-2. The portions of housing 12 that are covered with touch sensor 50 (sometimes referred to as touch-sensitive zones or touch-sensitive regions of item 10) may have any suitable shape. In the FIG. 12 example, touch sensor 50 forms a vertical touch-sensitive zone that extends down the side of housing 12 (e.g., parallel to the longitudinal axis of item 10).

Figure 13:
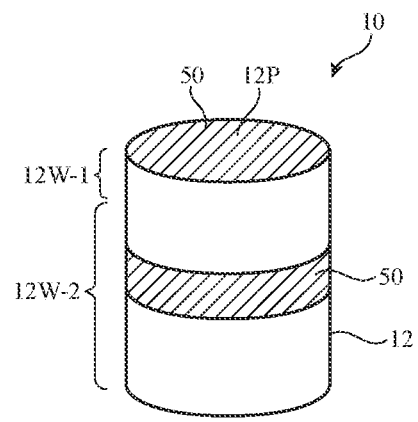

In the example of FIG. 13, touch sensor 50 is located on top portion 12P and select portions of lower wall region 12W-2. Touch sensor 50 of FIG. 13 may form a horizontal touch-sensitive zone that extends partially or completely around the circumference of housing 12 (e.g., surrounding the longitudinal axis of item 10).

Figure 14:
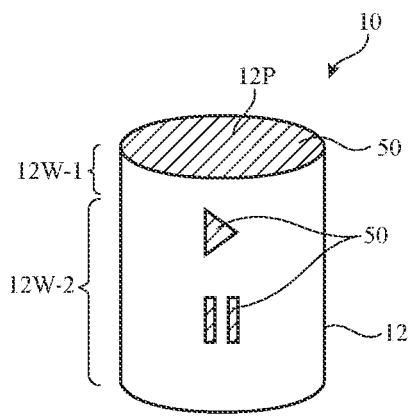

In the example of FIG. 14, touch sensor 50 is located on top portion 12P and select portions of lower wall region 12W-2. Touch sensor 50 of FIG. 14 may form touch-sensitive zones having shapes that correspond to user input control functions such as audio playback control symbols (e.g., a play symbol, a pause symbol, next and previous track symbols, increase and decrease volume symbols, etc.) and/or other control symbols (e.g., a menu symbol, a power symbol, a sleep symbol, etc.). Control circuitry 20 may take appropriate action based on touch input to a given touch-sensitive region (e.g., may play audio with speaker 32 in response to touch input on the touch-sensitive region that is shaped like a play symbol).

Figure 15:
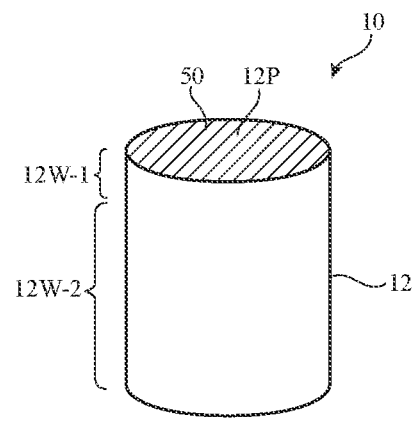

In the example of FIG. 15, touch sensor 50 is located only on top portion 12P of housing 12. Upper wall region 12W-1 and lower wall region 12W-2 may be free of touch sensors, if desired. In other arrangements, touch sensor 50 may be located on other portions of housing 12 and top portion 12P may be free of touch sensors. The examples of FIGS. 10-15 are merely illustrative.

Figure 16:
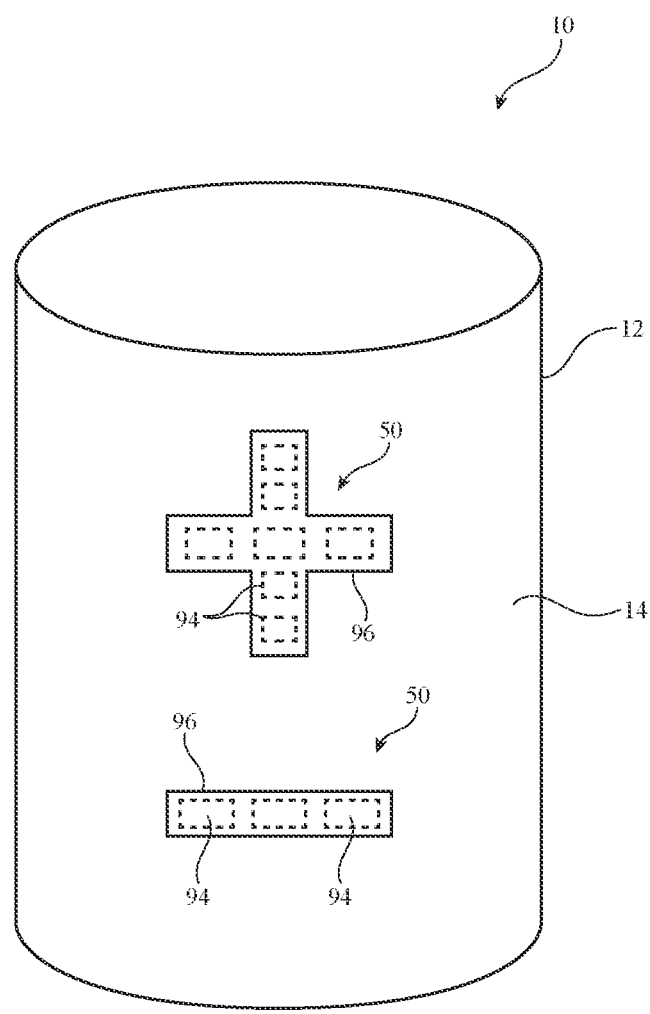
FIG. 16 is a side view of an illustrative electronic device having touch-sensitive regions shaped like media control symbols in accordance with an embodiment.

FIG. 16 shows how touch sensor 50 may be located in discrete touch-sensitive regions on housing 12 (e.g., similar to the example of FIG. 14). Touch-sensitive regions on device 10 such as touch-sensitive regions 96 may have any suitable shape. In the example of FIG. 16, touch-sensitive regions 96 have the shape of a plus symbol (e.g., for increasing volume) and a minus symbol (e.g., for decreasing volume). Touch sensor 50 may include touch sensor electrodes 94 (e.g., capacitive touch sensor electrodes formed from signal lines 62 of FIG. 5). The touch sensor electrodes 94 may be located in touch-sensitive zones 96 of item 10.

The location of touch-sensitive regions 96 may be static or dynamic. In a static arrangement, the location of touch-sensitive regions 96 remains fixed. For example, capacitive touch sensor electrodes 94 may be located in regions that are always touch-sensitive. In a dynamic arrangement, the location of touch-sensitive regions 96 may change. For example, control circuitry 20 may selectively activate and deactivate portions of touch sensor 50 to create touch-sensitive regions 96 and non-touch-sensitive regions. When control circuitry 20 activates the touch sensors 50 in the non-touch-sensitive regions, those regions may become touch-sensitive regions 96. When control circuitry 20 deactivates the touch sensors 50 in the touch-sensitive regions 96, those regions may become non-touch-sensitive regions. Control circuitry 20 may, if desired, selectively activate and deactivate certain touch sensor electrodes 94 to achieve a touch-sensitive region 96 having a desired shape (e.g., a media control symbol or a symbol corresponding to any other suitable user input function).

Figure 17:
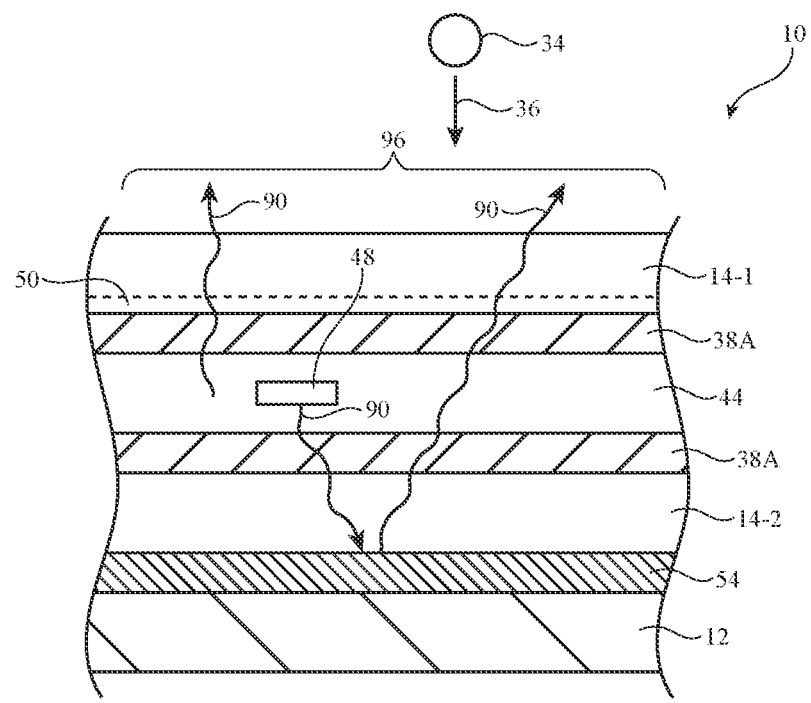
FIG. 17 is a cross-sectional side view of an illustrative electronic device having a light-emitting component that illuminates a touch-sensitive region in accordance with an embodiment.

FIG. 17 is a cross-sectional side view of a portion of the sidewalls of item 10 showing layers 38 over housing 12 in touch-sensitive regions 96. Layers 38 may include layer 54 (e.g., an acoustically transparent component-hiding layer interposed between layer 14-2 and housing 12), layer 14-2 (e.g., a fabric spacer layer or other layer), adhesive layers 38A, layer 44 (e.g., a light-emitting layer having light-emitting elements 48) interposed between adhesive layers 38A, touch sensor layer 50 (e.g., a touch sensor of the type shown in FIGS. 5-16), and layer 14-1 (e.g., a cosmetic fabric layer).

Figure 4:
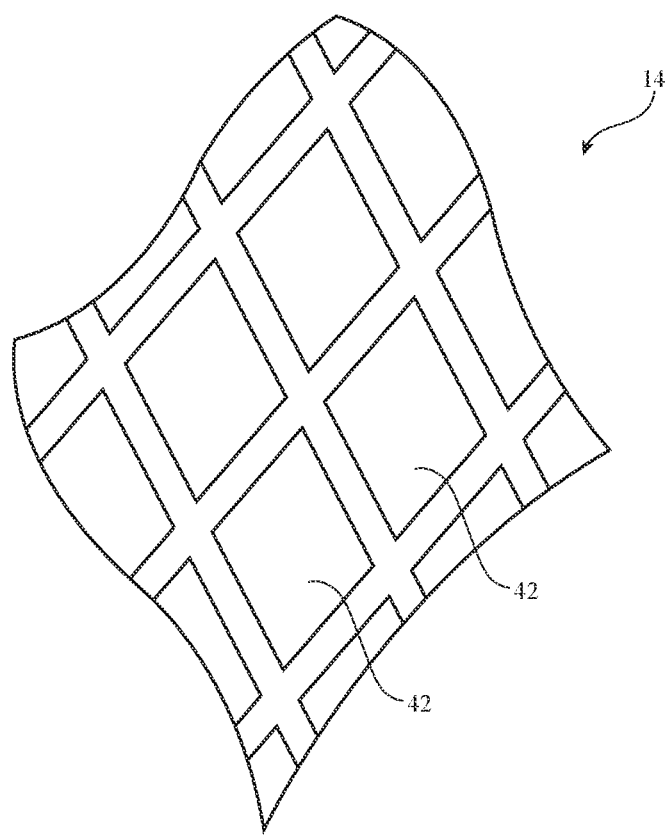
FIG. 4 shows how a layer of fabric may have openings such as diamond-shaped openings in accordance with an embodiment.

Layer 14-1 may be an outer cosmetic fabric layer such as layer 14 of FIG. 4. Openings 42 may be configured to allow sound to pass through layer 14-1. As shown in FIG. 17, other covering layers 38 may be interposed between outer layer 14-1 and housing 12.

Layer 54 may be a component-hiding layer such as a perforated polymer layer or a fabric layer formed from polymer strands or other strands of material. Layer 54 may help hide internal components in item 10 such as speaker 32 (FIG. 2) from view by user 34 viewing item 10 in direction 36. The polymer of layer 54 may be provided with light-scattering particles and/or may be coated with a reflective coating (e.g., a polymer coating with light-scattering particles, a metal coating, etc.), so that layer 54 serves as a reflective, acoustically transparent, component-hiding layer that reflects light (e.g., a layer with a visible light reflectivity of at least 50%, at least 70%, at least 85%, less than 99.9%, etc.).

Fabric spacer layer 14-2 may be formed from a cushiony layer of fabric (e.g., an outer layer of fabric, an opposing inner layer of fabric, and a spacer layer formed from spacer strands that extend back and forth between the outer and inner fabric layers). Fabric spacer layer 14-2 may be sufficiently porous to allow sound to pass or may be provided with openings such as openings 42 of FIG. 4 to allow sound to pass.

Layer 44 may be interposed between an outer adhesive layer 38A and an inner adhesive layer 38A. Adhesive layers 38A may have openings that allow sound to pass. The outer layer of adhesive 38A may be used to attach layer 14-1 to layer 44. The inner adhesive layer 38A may be used to attach layer 44 to spacer fabric layer 14-2.

Layer 44 may be a flexible printed circuit and may include light-emitting components that emit light 90. For example, layer 44 may have light-emitting devices (components 48) that are configured to emit light 90 inwardly toward housing 12 and/or outwardly towards user 34. The density of light-emitting devices 48 in layer 44 may be sufficient to form a display that is configured to display images for user 34 such as images containing text, graphics, moving images. In some configurations, the density of light-emitting devices 48 on some or all of layer 44 may be low so that the light-emitting devices are used mainly for displaying diffused fixed or moving patterns of light that serve as a visual indicator or visual feedback (e.g., abstract light patterns of one or more colors). For example, control circuitry 20 may illuminate light-emitting devices 48 to indicate where touch-sensitive regions 96 are located on item 10, to indicate which touch-sensitive regions 96 are active, and/or to provide visual feedback following touch input to touch sensor 50. Light-emitting devices 48 may be located only in touch-sensitive regions 96, may be located only in portions of item 10 that are not touch-sensitive, or may be located in touch-sensitive regions 96 and non-touch-sensitive regions of item 10.

If desired, control circuitry 20 may use light-emitting devices 48 to indicate what control function is associated with touch-sensitive regions 96. Light-emitting devices 48 may be used to display audio playback control symbols (e.g., a play symbol, a pause symbol, next and previous track symbols, increase and decrease volume symbols, etc.) and/or other control symbols (e.g., a menu symbol, a power symbol, a sleep symbol, etc.). For example, if a touch-sensitive region 96 is associated with an increase volume function, control circuitry 20 may use light-emitting devices 48 to display a plus symbol (e.g., by selectively turning on light-emitting devices 48 that overlap touch sensor electrodes 94 of FIG. 16).

If desired, one or more of layers 38 may serve as a diffuser layer for diffusing light 90 from light-emitting devices 48. For example, emitted light 90 may be diffused by the strands of material in fabric spacer layer 14-2 as light 90 passes inwardly toward housing 12 and again as light 90 passes outwardly from housing 12 to users 34 after reflecting from reflective structures such as layer 54. Optional additional light diffusion layers may be included in layers 38, if desired. For example, one or more light diffusing layers may be located between housing 12 and layer 54, between layers 14-2 and 54, between layers 14-2 and 44, between layers 44 and 14-1 and/or in other locations in layers 38. In one illustrative configuration, a diffuser formed from a frosted polymer film may be interposed between one or more, two or more, or three or more of any of the interfaces between layers 38 of FIG. 17 to help diffuse light 90 as light 90 passes through the diffuser layer. In another illustrative configuration, layers 38 contain no frosted polymer films.

In the example of FIG. 17, touch sensor 50 is located between fabric layer 14-1 and light-emitting layer 44. This is merely illustrative, however. Touch sensor 50 may be integrated into a fabric layer in layers 38 (e.g., may be formed from conductive strands in fabric layer 14-1, fabric layer 14-2, component-hiding layer 54, and/or a separate fabric layer in layers 38), or touch sensor 50 may be formed from conductive traces on a substrate in layers 38 (e.g., traces on fabric layer 14-1, light-emitting layer 44, fabric layer 14-2, component-hiding layer 54, housing 12, and/or a separate substrate in layers 38).

In general, light diffusing material, component-hiding material, dust-blocking material, additional flexible substrate(s) with electrical components, adhesive and/or coating structures (e.g., reflective coatings such as coatings of white ink, metal, etc.), may be located at one or more, two or more, or three or more of the interfaces between layers 38 of FIG. 17 and may be coupled to the outwardly facing and/or inwardly facing surfaces at each of these interfaces. If desired, a flexible mesh substrate such as layer 44 may include antenna traces (e.g., metal traces for forming patch antennas, inverted-F antennas, loop antennas, coils for inductive power transfer, monopoles, dipoles, etc.), metal traces forming capacitive sensor electrodes and/or signal interconnect traces, and/or other metal traces. Flexible mesh substrate layers in layers 38 such as layer 44 may also include electrical components such as components for forming input-output devices 18 and/or control circuitry 20 of FIG. 1. If desired, multiple layers such as layer 44 may be located in the stack of layers 38 in FIG. 17.

Figure 18:
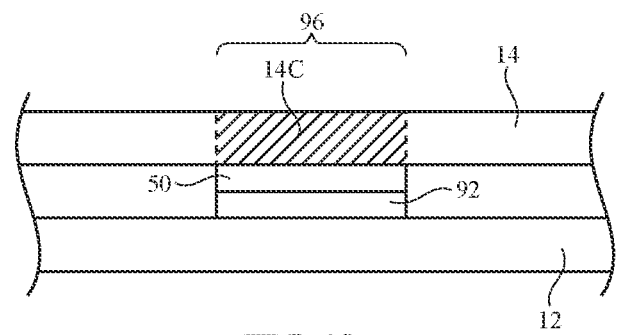
FIG. 18 is a cross-sectional side view of an illustrative electronic device having touch-sensitive fabric regions that are visually distinct from fabric regions that are not touch-sensitive in accordance with an embodiment.

The example of FIG. 17 in which touch-sensitive regions 96 have dynamic (e.g., adjustable) visual output capabilities is merely illustrative. If desired, touch-sensitive regions 96 may be marked using static visual output. This type of arrangement is illustrated in FIG. 18. As shown in FIG. 18, touch-sensitive region 96 may be marked using a portion of outer fabric layer 14, such as region 14C. Region 14C may be visually distinct from the surrounding portions of fabric 14. For example, region 14C of fabric layer 14 may have a different color threads, may have a different fabric construction, may have different texture, may have a different reflectivity, or may have other characteristics that are different from the surrounding portions of fabric 14 (e.g., different from the portions of fabric 14 that do not overlap touch-sensitive regions 96 of item 10).

If desired, one or more haptic output components may be located in touch-sensitive regions 96 of fabric 14. For example, as shown in FIG. 18, haptic output component 92 may overlap touch sensor 50 in region 96. Haptic output component 92 may be a vibrator, an actuator, or other suitable component configured to provide tactile feedback to a user. Haptic output component 92 may be used to provide haptic feedback to the user in response to touch input on fabric 14 in region 96, and/or haptic output component 92 may be used to raise or lower localized portions of fabric 14 so that a user knows where touch-sensitive regions 96 are located on item 10. Haptic output component 92 may be located only in touch-sensitive region 96 and/or may be located in other portions of item 10.

The foregoing is merely illustrative and various modifications can be made to the described embodiments. The foregoing embodiments may be implemented individually or in any combination.

What is claimed is:

1. An electronic device, comprising:
a housing;
a speaker in the housing configured to emit sound;
a fabric cover on an outer surface of the housing, wherein the fabric cover has first openings through which the sound passes; and
a touch sensor configured to detect touch input on the fabric cover, wherein the touch sensor has second openings through which the sound passes, wherein the first openings are aligned with the second openings, and wherein the first openings and the second openings have matching shapes.

2. The electronic device defined in claim 1 wherein the housing has a spherical shape.

3. The electronic device defined in claim 1 wherein the touch sensor comprises a substrate, drive lines on the substrate, and sense lines on the substrate.

4. The electronic device defined in claim 1 wherein the touch sensor comprises a fabric touch sensor having first strands that form drive lines and second strands that form sense lines.

5. The electronic device defined in claim 1 wherein the fabric cover comprises a spacer fabric.

6. The electronic device defined in claim 5 wherein the spacer fabric comprises first and second warp knit layers joined by a spacer layer.

7. The electronic device defined in claim 1 wherein the touch sensor comprises touch sensor electrodes, the electronic device further comprising control circuitry configured to selectively activate and deactivate the touch sensor electrodes.

8. The electronic device defined in claim 7 further comprising light-emitting devices configured to illuminate the touch sensor electrodes that are activated.

9. The electronic device defined in claim 8 further comprising a diffuser that diffuses light from the light-emitting devices.

10. The electronic device defined in claim 7 wherein the fabric cover has non-touch-sensitive regions that are unilluminated.

11. An electronic device, comprising:
a spherical housing;
a spacer fabric on an outer surface of the spherical housing, wherein the spacer fabric has touch-sensitive regions and non-touch-sensitive regions;
a speaker in the spherical housing configured to emit sound through the spacer fabric; and
light-emitting devices that form illuminated symbols on the respective touch-sensitive regions of the spacer fabric to distinguish the touch-sensitive regions of the spacer fabric from the non-touch-sensitive regions of the spacer fabric.

12. The electronic device defined in claim 11 further comprising capacitive touch sensor electrodes configured to detect touch input on the touch-sensitive regions of the spacer fabric.

13. The electronic device defined in claim 12 further comprising control circuitry configured to control the speaker in response to the touch input.

14. An electronic device, comprising:
a spherical housing;
a spacer fabric on an outer surface of the spherical housing, wherein the spacer fabric has touch-sensitive regions and non-touch-sensitive regions;
capacitive touch sensor electrodes configured to detect touch input on the touch-sensitive regions of the spacer fabric;
a speaker in the spherical housing configured to emit sound through the spacer fabric;
light-emitting devices that illuminate the touch-sensitive regions of the fabric to distinguish the touch-sensitive regions of the fabric from the non-touch-sensitive regions of the fabric; and
control circuitry configured to control the speaker in response to the touch input, wherein the control circuitry is configured to adjust a location of the touch-sensitive regions on the spacer fabric.

15. The electronic device defined in claim 14 wherein the control circuitry is configured to selectively activate and deactivate the capacitive touch sensor electrodes.

16. An electronic device, comprising:
a housing that is at least partially spherical;
a speaker in the housing;
a fabric cover on the housing;
a touch sensor configured to detect touch input on the fabric cover, wherein the touch sensor forms a loop around the housing and wherein the fabric cover and the touch sensor have aligned openings with matching shapes; and
control circuitry configured to control the speaker in response to the touch input.

17. The electronic device defined in claim 16 wherein the touch sensor comprises drive lines and sense lines on a substrate.

18. The electronic device defined in claim 16 wherein the touch sensor comprises a fabric touch sensor having first conductive strands that form drive lines and second conductive strands that form sense lines.

19. The electronic device defined in claim 16 wherein the housing has a diameter and wherein the touch sensor extends around the entire diameter.

20. The electronic device defined in claim 16 wherein the touch sensor comprises capacitive touch sensor electrodes and wherein the control circuitry is configured to selectively activate and deactivate the capacitive touch sensor electrodes.

* * * * *